United States Patent [19]

Eto et al.

[11] Patent Number: 4,864,873
[45] Date of Patent: Sep. 12, 1989

[54] TORQUE SENSOR

[75] Inventors: Kunihiko Eto; Shiro Takeuchi, both of Toyota, Japan

[73] Assignee: Toyoda Koki Kabushiki Kaisha, Kariya, Japan

[21] Appl. No.: 155,873

[22] Filed: Feb. 16, 1988

[30] Foreign Application Priority Data

Mar. 26, 1987 [JP] Japan ................................. 62-72851

[51] Int. Cl.[4] ............................. G01L 3/14; G01L 3/10
[52] U.S. Cl. ............................... 73/862.32; 73/862.33
[58] Field of Search ......................... 73/862.32, 862.33

[56] References Cited

U.S. PATENT DOCUMENTS

| | | | |
|---|---|---|---|
| 2,260,036 | 10/1941 | Kuehni | 73/862.33 X |
| 2,964,017 | 12/1960 | Hruska . | |
| 3,823,608 | 7/1974 | Pantermuehl et al. | 73/862.33 |
| 4,685,528 | 8/1987 | Suzuki et al. . | |

FOREIGN PATENT DOCUMENTS

| | | | |
|---|---|---|---|
| 58-70136 | 4/1983 | Japan . | |
| 59-32835 | 2/1984 | Japan . | |
| 288360 | 12/1970 | U.S.S.R. | 73/862.33 |
| 466414 | 4/1975 | U.S.S.R. | 73/862.33 |

Primary Examiner—Charles A. Ruehl
Attorney, Agent, or Firm—Oblon, Spivak, McClelland, Maier & Neustadt

[57] ABSTRACT

A torque sensor in which a main shaft and a follower shaft are supported rotatably relative to each other on a common axis. A sleeve is supported axially slidable on one of the main and follower shafts. A deviation sensor is responsive to axial movement of the sleeve to output a signal corresponding to the quantity of the axial movement. At least one set of torque transmitting members is provided to transmit the torque applied to the main shaft to the follower shaft and to move the sleeve axially in accordance with the torque. The at least one set of torque transmitting members comprises a first connection body extending parallel to the common axis, inclined in a plane offset radially of the main and follower shafts, and connected at one and the other ends to the sleeve and main shaft, respectively. It also includes a second connection body provided inclined in the plane and in the opposite direction to that in which the first connection body is inclined, and connected at one and the other ends to the sleeve and the follower shaft, respectively.

8 Claims, 7 Drawing Sheets

TORQUE SENSOR

BACKGROUND OF THE INVENTION

1. Field of the Invention

This invention relates to a torque sensor suitable for use in a steering device of a vehicle, etc.

2. Discussion of the Prior Art

Figure 1:
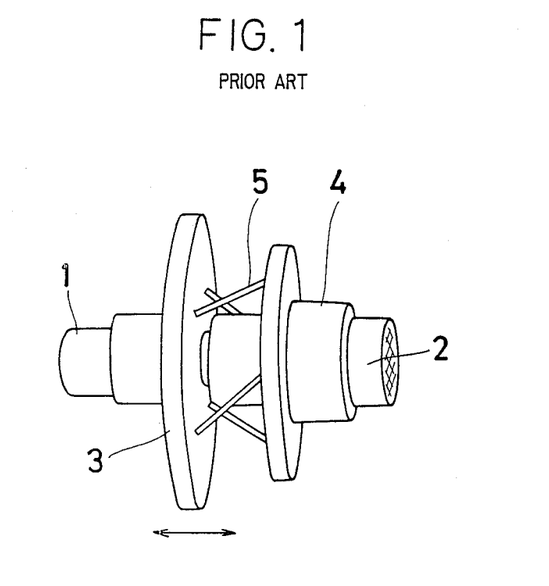
FIG. 1 is a perspective view showing a conventional mechanism applicable to a torque sensor.

A valve operating mechanism for a conventional power steering device control valve is disclosed, for example, in U.S. Pat. No. 2,964,017 to Howard E. Hruska. This conventional device is not a torque sensor but has a specific structure in which, as shown in FIG. 1, a slide cylinder 3 on a main shaft 1 is coupled by springs 5 to a fixed sleeve 4 on a follower shaft 2. The rotation of the main shaft 1 causes the slide cylinder 3 to move axially to transmit an axial shift of the slide cylinder 3 to a spool (not shown).

According to such conventional valve operating mechanism, the respective springs 5 at an attitude inclined at 45 degrees at the neutral steering position change their attitude such that the respective springs gradually increase or otherwise decrease their inclination as the main shaft 1 rotates. Therefore, the quantity of axial shift of the slide cylinder 3 for unit angular rotation of the main shaft 1 varies depending upon the angle phase thereof. As a result, an imbalance occurs in the quantities of shift of the spool valve occurring when the steering wheel is rotated clockwise and counterclockwise, respectively. Therefore, if such an operating mechanism is applied to the torque sensor, the sensed torque value would vary depending on the direction of rotation of the main shaft even if the same torque may act on the main shaft.

SUMMARY OF THE INVENTION

Therefore, it is a main object of this invention to provide a torque sensor which is capable of shifting the slide cylinder accurately by an equal quantity axially when the main shaft receives a torque and is rotated in one direction and in an opposite direction by the same angle relative to the follower shaft.

Briefly, in a torque sensor according to this invention, a slide cylinder is fitted axially slidably over one of the main shaft and follower shaft which are rotatable relative to each other on the same axis. A deviation sensor is provided for outputting a signal corresponding to a torque acting on the main shaft in response to an axial deviation of the slide cylinder. First and second connecting bodies are provided inclined in opposite directions in a plane parallel to the axis. The first and second connection bodies are connected at one end to the slide cylinder and at the other end to the main and follower shafts.

According to this structure, even if the main shaft is rotated in any direction, the first and second connection bodies are inclined in an opposite direction maintaining the angle therebetween at a constant value at supplementary angle relationship. Therefore, the quantity of the axial deviation of the slide cylinder, namely, the output of the shaft sensor, is free from imbalance due to the direction of rotation to thereby achieve high-accuracy torque detection.

BRIEF DESCRIPTION OF THE ACCOMPANYING DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
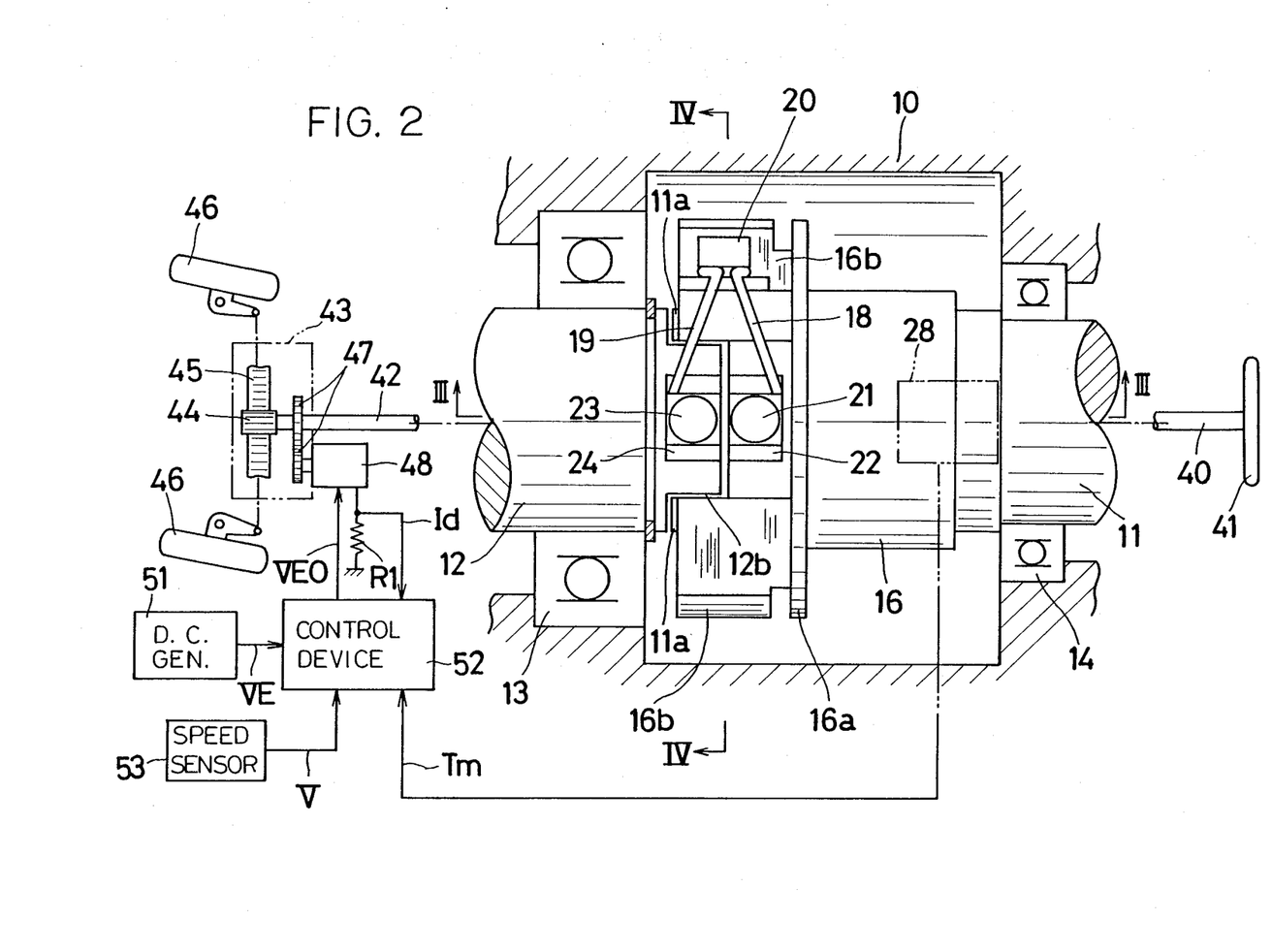
FIG. 2 is a front view of a torque sensor according to this invention.
Figure 3:
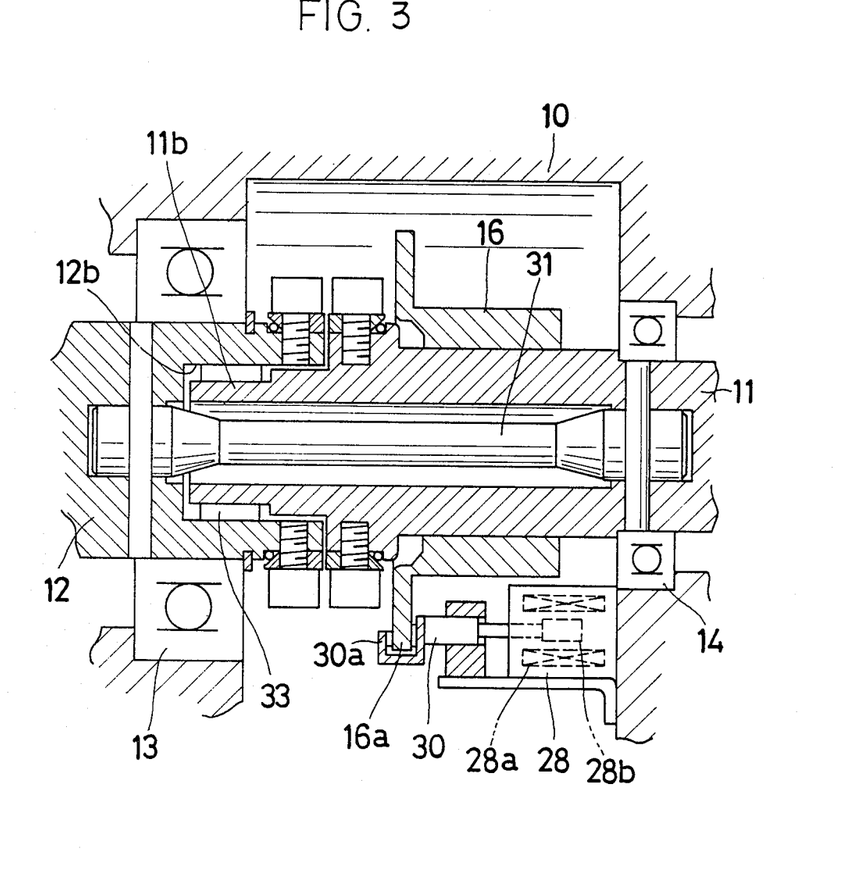
FIG. 3 is a cross-section view taken along the line III—III in FIG. 2.
Figure 4:
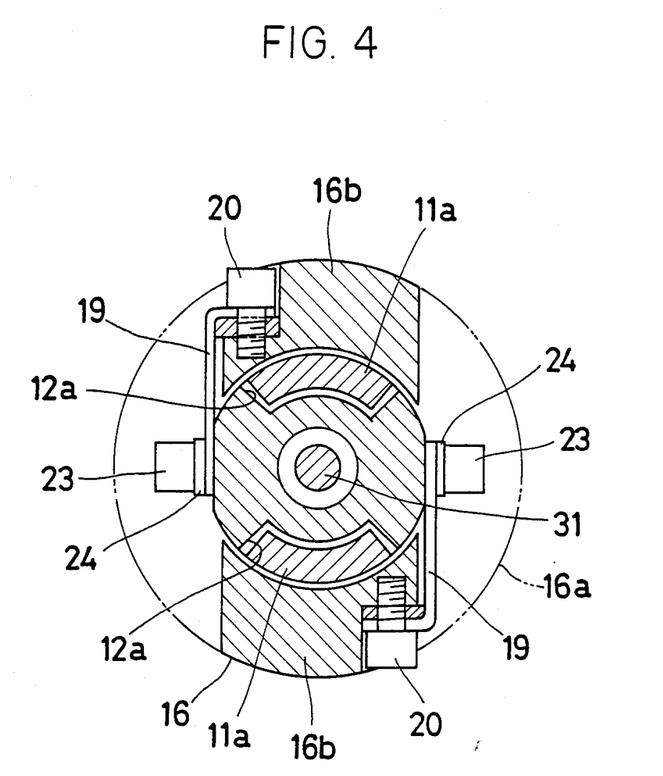
FIG. 4 is a horizontal cross-section view taken along the line IV—IV in FIG. 2.

In FIGS. 2–4, reference numeral 10 denotes a housing, for example, of a steering column of a vehicle. In the housing 10, a main shaft 11 coupled to a steering wheel shaft and a follower shaft 12 coupled to an input shaft of the steering device are rotatably supported on the common rotational axis by bearing 13 and 14. The main shaft 11 is held by the follower shaft 12 such that a pair of sectral protrusions 11a formed on an end of the main shaft 11 are fitted loosely into a pair of corresponding sectral recesses 12a formed in the follower shaft 12. The central shaft 11b of the main shaft 11 is fitted into a hole 12b in the follower shaft 12 such that the main shaft is supported concentrically with the follower shaft 12. The sectral protrusions 11a and sectral recesses 12b allow a slight relative rotation between the main shaft 11 and follower shaft 12.

A slide cylinder 16 or sleeve is fitted around the main shaft 12 so as to rotate and slide axially. The slide cylinder 16 includes a flange portion 16a and a pair of jaws 16b, to each of which is integrally attached first and second connection bodies 18 and 19 by bolts 20. The bodies 18 and 19 are made of a spring material and extend so as to be swingable in a plane parallel to a plane which contains the width midpoint of the sectral protrusions 11a and the axis of rotation and are inclined relative to each other in opposite directions. The first connection body 18 is fixed integrally at one end by a fixing bolt 21 and a holding metal member 22 to the main shaft 11. The second connection body 19 is fixed integrally at one end to the follower shaft 12 by a fixing bolt 23 and a holding metal member 24. Therefore, by the rotation of the main shaft 11 relative to the follower shaft 12, the first and second connection bodies 18 and 19 are inclined in opposite directions from each other and an axial deviation corresponding to this inclination is applied to the slide cylinder 16.

A deviation sensor 28 which senses axial deviation of the slide cylinder 16 is connected to the flange 16a. The deviation sensor 28 is composed of a differential transformer which includes a well-known coil 28a and a core 28b. The core 28b and the flange 16a of the slide cylinder 16 are connected via a connection bar 30, so that an axial deviation of the slide cylinder 16 is sensed as an electric signal. The connection bar 30 has at one end a U-like member 30a which is allowed to rotate relative to the flange 16a only in the direction of the rotation of flange 16a.

Reference numeral 31 denotes a torsion bar which connects the main and follower shafts 11 and 12 resiliently. The torsion bar 31 may be omitted using the spring rigidity of the first and second connection bodies 18 and 19. Reference numeral 33 denotes a needle bearing.

The operation of the torque sensor having the above structure will now be described. When the main shaft 11 is at a neutral position, the first and second connection bodies 18 and 19 have an inclination symmetrical with reference to a vertical dot-dashed line, as shown in FIG. 5(B).

Figure 5:
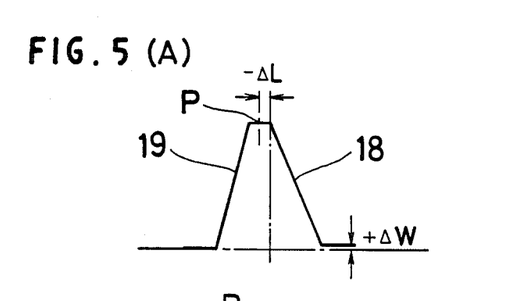
FIGS. 5(A), 5(B) and 5(C) illustrate a deformation of the first and second connection bodies.

If the main shaft 11 is now rotated clockwise through a predetermined angle, the first connection body 18 is swung gradually in the direction in which the first connection body is inclined, while the second connection body 19 is swung in the direction in which the second connection body 19 rises, as shown in FIG. 5(A). As a result, the point P on the slide cylinder 16 coupled to the first and second connection bodies 18 and 19 deviates by $\Delta L$ in one direction, so that the quantity of deviation L is transduced into an electric signal by a deviation sensor 28 and output as a torque sensing signal.

If the main shaft 11 is rotated counterclockwise through the same predetermined angle, the first connection body 18 is swung in the direction in which the first connection body rises, while the second connection body 19 is swung in the direction in which the second connection body is inclined as shown in FIG. 5(C). As a result, the point P on the slide cylinder 16 coupled to the first and second connection bodies 18 and 19 deviates by $\Delta L$ in the +direction opposite to that mentioned above, so that the quantity of deviation $\Delta L$ is sensed as a torque sensing signal by the deviation sensor 28.

Figure 6:
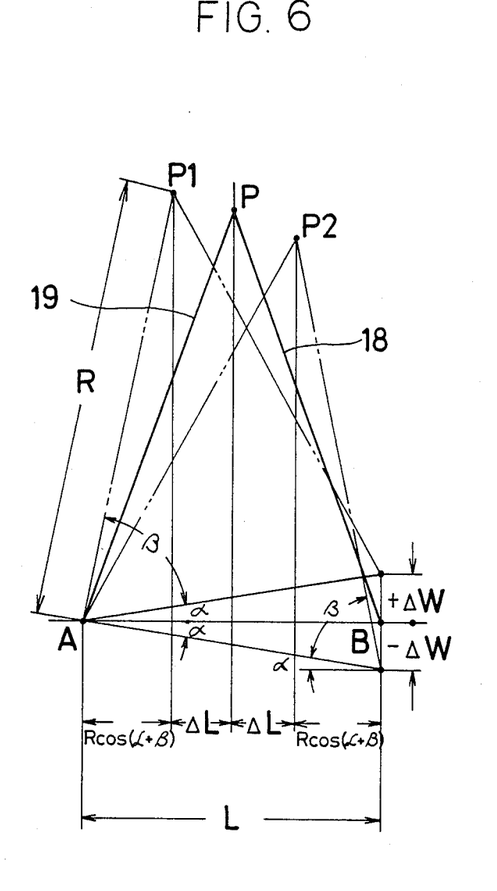
FIG. 6 illustrates a quantity of axial deviation of the slide cylinder.

FIG. 6 shows a deviation of the first and second connection bodies 18 and 19 occurring when the main shaft 11 is rotated clockwise or counterclockwise through a predetermined angle.

As shown, when the main shaft 11 is rotated through $+W$ or $-W$, the point P on the slide cylinder 16 moves to P1 or P2. At this time, the axial deviation quantities $+\Delta L$ and $-\Delta L$ of the point P are all $L/2 - R \times \cos(\delta+\beta)$ and equal irrespective of clockwise or counterclockwise rotation, so that no imbalance occurs between quantities of axial deviation depending on the direction of rotation.

In FIG. 6;

A and B denote fixed points on the main shaft 11 and follower shaft 12 of the first and second connection bodies 18 and 19, respectively;

L is the distance between the fixed points A and B; and R, the length of the first and second connection bodies 18 and 19;

$\delta$ is the angle of elevation of the point B obtained when the main shaft 11 is rotated by $+-W$;

$\beta$ is an angle formed by the first or second connection body 18 or 19 relative to the line segment A—B obtained when the main shaft is rotated by $+-\Delta W$.

Therefore, it will be understood that the first and second connection bodies 18 and 19 constitute the legs of an equilateral triangle whose base is defined by fixed points A and B and that the angle formed by the legs is kept constant even if the point P takes the position of any one of P1 and P2.

While in the above embodiment two sets of first and second connection bodies 18 and 19 are provided with a phase difference of 180 degrees in the direction of rotation, this invention is not limited to it. For example, three or four sets of first and second connection bodies 18 and 19 may be provided with a phase difference of 120 degrees or 90 degrees, which serves to improve the support rigidity of the slide cylinder 16 to thereby prevent an inclination of the slide cylinder 16 and hence an increase in the sliding resistance thereof due to the inclination of the slide cylinder 16.

Figure 7:
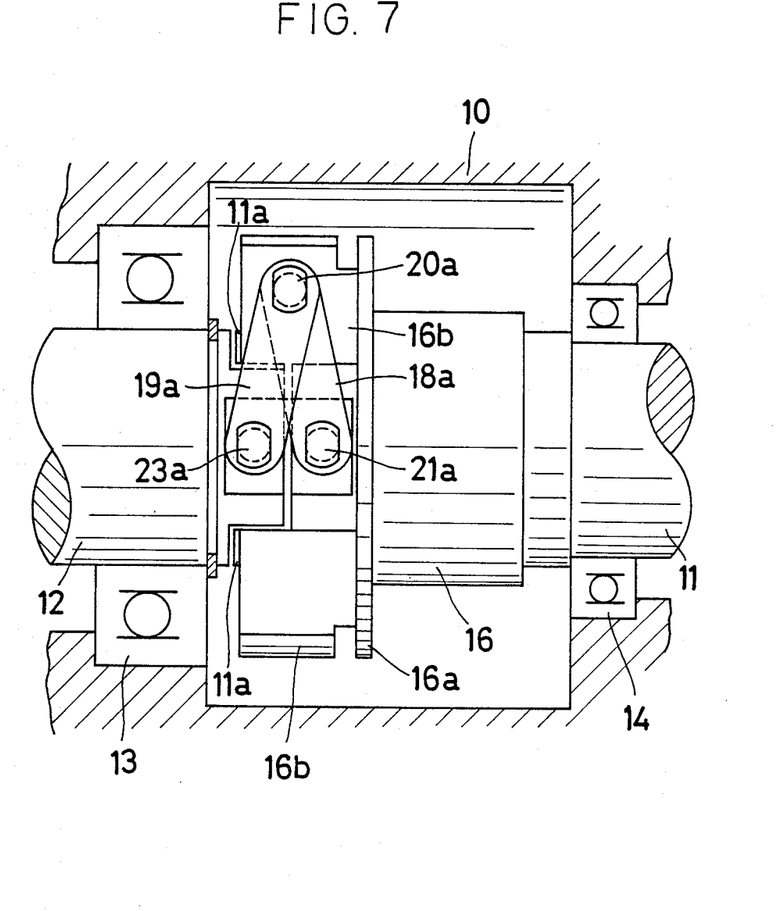
FIG. 7 is a front view of another embodiment of a torque sensor according to this invention.

While in the above embodiment the first and second connection bodies 18 and 19 are made of a spring material, this invention is not limited to it. For example, as shown in FIG. 7, the first and second connection bodies may be constituted by links 18a and 19a which are not elastically deformed and pivoted to the drive shaft 11, follower shaft 12 and slide cylinder 16 by hinge or pivot pins 21a, 23a and 20a, respectively.

Referring back to FIG. 2, there is also shown an electric power steering device in which the aforementioned torque sensor according to the present invention is incorporated. In the steering device, the steering wheel shaft 40 with a steering wheel 41 is connected to the main shaft 11 of the torque sensor, while the input shaft 42 of the steering device is connected to the follower shaft 12 of the torque sensor. The input shaft 42 is rotatably carried by a gear box 43 and is formed with a pinion 44 which meshes with a rack 45 axially slidably received in the gear box 43. Although not shown, opposite ends of the rack 45 are connected to steerable front wheels 46 through ball joints and the like, as is well known in the art. Further, the input shaft 42 is drivingly coupled through a pair of gears 47 to an electric motor 48 which generates an assisting power.

A voltage VE from a d.c. generator or dynamo 51 drivingly connected to the automotive engine (not shown) is generated upon rotation of the engine and is applied to the electric motor 48 through a control circuit 52. The circuit 52 receives a steering effort signal Tm from the aforementioned deviation sensor 28 of the torque sensor, a vehicle speed signal (V) from a vehicle speed sensor 53 and a load current Id from the electric motor 48. The circuit 52 controls an input voltage VEO to the electric motor 48 so that when the vehicle speed V is within a low speed range (e.g., less than 60 km/h), the assisting power generated by the electric motor 48 is nonlinearly varied with the variation in the steering effort Tm in such a manner as to make the increasing rate of the assisting power larger as the vehicle speed V decreases and so that when the vehicle speed V is within a high speed range (e.g., 60 km/h or more), the assisting power is linearly varied with variation in the steering effort Tm in such a manner as to make the increasing rate of the assisting power smaller as the vehicle speed V increases.

The aforementioned power steering device is described in greater detail in U.S. Pat. No. 4,685,528 owned by the same assignee of the present application.

It is to be noted that the sectral protrusions 11a and sectral recesses 12b of the torque sensor as described above limits the relative rotation between the main shaft 11 and the follower shaft 12 to an angle of several degrees in either direction. Thus, even in the event that the connection bodies 18, 19 or the links 18a, 19a are broken, the steering effort applied to the steering wheel 41 can be reliably transmitted to the input shaft 42 of the power steering device.

Obviously, numerous modifications and variations of the present invention are possible in light of the above teachings. It is therefore to be understood that within the scope of the appended claims, the present invention may be practiced otherwise than as specifically described herein.

We claim:

1. A torque sensor comprising:
   a main shaft and a follower shaft supported rotatably relative to each other on a common axis;
   a sleeve supported axially slidably on one of the main and follower shafts;
   a deviation sensor responsive to axial movement of the sleeve for outputting a signal corresponding to the quantity of the axial movement; and
   at least one set of torque transmitting means, for transmitting the torque applied to the main shaft to the follower shaft and moving the sleeve axially in accordance with the torque, the at least one set of torque transmitting means comprising:
   a first connection body inclined in a plane extending parallel to said common axis and offset radially of the main and follower shafts, and connected at facing ends to the sleeve and main shaft, respectively; and
   a second connection body positioned in said plane and inclined in the plane in the opposite direction to that in which the first connection body is inclined, and connected at facing ends to the sleeve and the follower shaft, respectively.

2. A torque sensor according to claim 1, wherein a plurality of sets of the torque transmitting means are provided at equal intervals in the direction of rotation of the main and follower shafts.

3. A torque sensor according to claim 2, wherein the first and second connection bodies constituting the torque transmitting means of each set are made of a spring material.

4. A torque sensor according to claim 2, wherein the first and second connection bodies constituting the torque transmitting means of each set comprise a first and a second link member, respectively; and the torque transmitting means of each set comprises:
   a first hinge pin for pivotally supporting one end of the first and second link members to the sleeve such that those ends of the members overlap; and
   second and third hinge pins for pivotally supporting the other end of the first and second link members to the main and follower shafts, respectively.

5. A torque sensor according to claim 2, further including means provided at the opposing ends of the main and follower shafts for mechanically limiting the relative rotation of both the main and follower shafts through more than a predetermined angle.

6. A torque sensor according to claim 2, further including a torsion bar provided concentrically with the main and follower shafts and fixed at one and the other ends to the main and follower shafts, respectively.

7. A torque sensor according to claim 1, wherein the first and second connection bodies are of substantially the same length.

8. A torque sensor according to claim 1, wherein the angle formed between the first and second connection bodies is kept constant irrespective of a relative rotation of the main and follower shafts.

* * * * *